United States Patent
Ramkull et al.

(10) Patent No.: US 8,670,761 B2
(45) Date of Patent: Mar. 11, 2014

(54) PLMN FREQUENCY SEARCH TRIGGERED BY COUNTRY CODE CHANGE

(75) Inventors: Joachim Ramkull, Lund (SE); Tomas Ekstedt, Lund (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 926 days.

(21) Appl. No.: 12/100,732

(22) Filed: Apr. 10, 2008

(65) Prior Publication Data

US 2009/0258645 A1 Oct. 15, 2009

(51) Int. Cl.
*H04W 4/00* (2009.01)

(52) U.S. Cl.
USPC .............. 455/432.1; 455/435.2; 455/434; 455/435.3

(58) Field of Classification Search
USPC .............. 455/422.1, 432.1–435.3, 404.2, 455/456.1–457, 436–444, 450–455, 464, 455/509; 340/539.13, 988–996; 370/321–337, 339, 341–348, 431–463
See application file for complete search history.

(56) References Cited

U.S. PATENT DOCUMENTS

| | | | |
|---|---|---|---|
| 5,875,400 A * | 2/1999 | Madhavapeddy et al. .... | 455/458 |
| 6,148,203 A | 11/2000 | Renko et al. | |
| 7,167,707 B1 * | 1/2007 | Gazzard et al. .............. | 455/434 |
| 2003/0232631 A1 | 12/2003 | Ohmori | |
| 2005/0107082 A1 | 5/2005 | Gunaratnam et al. | |
| 2005/0107109 A1 * | 5/2005 | Gunaratnam et al. ........ | 455/525 |
| 2006/0160532 A1 * | 7/2006 | Buckley et al. ............ | 455/422.1 |
| 2007/0004402 A1 * | 1/2007 | Buckley ..................... | 455/432.1 |
| 2007/0207815 A1 | 9/2007 | Alfano et al. | |
| 2007/0298795 A1 | 12/2007 | Zinn | |
| 2008/0194253 A1 * | 8/2008 | Kuo et al. ..................... | 455/433 |
| 2009/0088154 A1 * | 4/2009 | Umatt et al. .................. | 455/434 |

FOREIGN PATENT DOCUMENTS

| | | |
|---|---|---|
| CA | 2595740 A1 | 2/2008 |
| CN | 1343434 A | 4/2002 |
| EP | 1740001 A1 | 1/2007 |
| JP | 2004023391 A | 1/2004 |
| JP | 2006519513 A | 8/2006 |
| JP | 2007013989 A | 1/2007 |
| JP | 2008042913 A | 2/2008 |
| WO | 0054542 A1 | 9/2000 |
| WO | 0105174 A1 | 1/2001 |
| WO | 2005048626 A1 | 5/2005 |
| WO | 2005048632 A1 | 5/2005 |

OTHER PUBLICATIONS

International Search Report, application No. PCT/EP2009/053874. Date of mailing: Jul. 14, 2009. European Patent Office, Rijswijk, Netherlands.

* cited by examiner

*Primary Examiner* — Ronald Eisner
(74) *Attorney, Agent, or Firm* — Coats & Bennett, P.L.L.C.

(57) ABSTRACT

A mobile UE initiates a full search of all supported frequencies upon detecting a change in the Mobile Country Code (MCC) transmitted by a PLMN. The change in MCC indicates the user had crossed a political border, and the spectrum allocated for wireless communication may be different. In one embodiment, the mobile UE stores the current MCC. Upon obtaining an updated MCC, it is compared to the stored MCC. If the updated MCC is different from the stored MCC, the full frequency search is initiated. To prevent excessive searching, with concomitant power consumption, while traveling near a border, the UE waits a predetermined duration after an MCC-initiated full scan before conducting a subsequent full scan, even if the MCC changes within that duration.

10 Claims, 3 Drawing Sheets

PLMN FREQUENCY SEARCH TRIGGERED BY COUNTRY CODE CHANGE

FIELD OF THE INVENTION

The present invention relates generally to wireless communication systems, and in particular to triggering a PLMN frequency search upon a change in country code.

BACKGROUND

Wireless communication systems, also known as Public Land Mobile Networks (PLMN) are well known and widely deployed. A variety of protocols are in use, such as GSM, CDMA 2000, WCDMA, UMTS, and the like. These systems are operated at different frequencies by different service providers, depending on the spectrum allocated and made available by the governments of the countries in which they are deployed. In particular, many systems utilize Frequency Division Duplex (FDD), whereby downlink traffic from a network to User Equipment (UE) is transmitted on carriers that are spaced apart in frequency from uplink traffic from UE to the network. Other systems utilize Time Division Duplex (TDD), and carry both uplink and downlink transmissions in one frequency band. Frequency bands that are utilized in one geographical area may or may not be the same frequencies used in other geographical areas. For example, while most of Europe has service providers offering GMS in bands at 900 and 1800 MHz and UMTS at 2100 MHz, service providers in both Sweden and Norway also provided a CDMA 2000 system at 450 MHz.

Modern mobile UE often include frequency-agile transceivers, and can operate in two or more different PLMNs operating at different frequencies. On power-up, for example, these UE scan all of the frequencies in which they can operate, to locate an operative PLMN cell and register for wireless communication services. The UE may operate only within the "found" frequencies, so long as the user does not move out of the current geographical area. To detect such movement, and for other reasons, the UE periodically engages in a full linear search of all supported frequencies. This is to detect movement into a different geographical area, and also to locate a preferred or prioritized PLMN (for example, one having an economic arrangement with the user's home PLMN that reduces the cost of the preferred PLMN over other available systems), or to locate a system that provides additional services (e.g., dedicated packet data services, audio/video content broadcasts, and the like).

A full frequency search consumes power, as the transceiver circuits must change their operating characteristics. Since most mobile UE are battery powered, conserving power consumption is an important consideration, to provide a reasonable useful life between recharges. Accordingly, full searches of the mobile UE's supported spectrum are preferably infrequent from the viewpoint of power management. However, a longer delay between such frequency band searches prolongs the time required for the mobile UE to detect a new cell when the UE leaves the current geographical area and moves into another geographical area where other frequency bands are utilized. It would therefore be beneficial for the mobile UE to detect its movement into another geographical area, to trigger a frequency search sooner than the next scheduled routine frequency search.

SUMMARY

According to one or more embodiments of the present invention disclosed and claimed herein, a mobile UE initiates a full search of all supported frequencies upon detecting a change in the Mobile Country Code (MCC) transmitted by a PLMN. The change in MCC indicates the user had crossed a political border, and the spectrum allocated for wireless communication may be different. In one embodiment, the mobile UE stores the current MCC. Upon obtaining an updated MCC, it is compared to the stored MCC. If the updated MCC is different than the stored MCC, the full frequency search is initiated. To prevent excessive searching, with concomitant power consumption, while traveling near a border, the UE waits a predetermined duration after an MCC-initiated full scan before conducting a subsequent full scan, even if the MCC chances within that duration.

DETAILED DESCRIPTION

Figure 1:
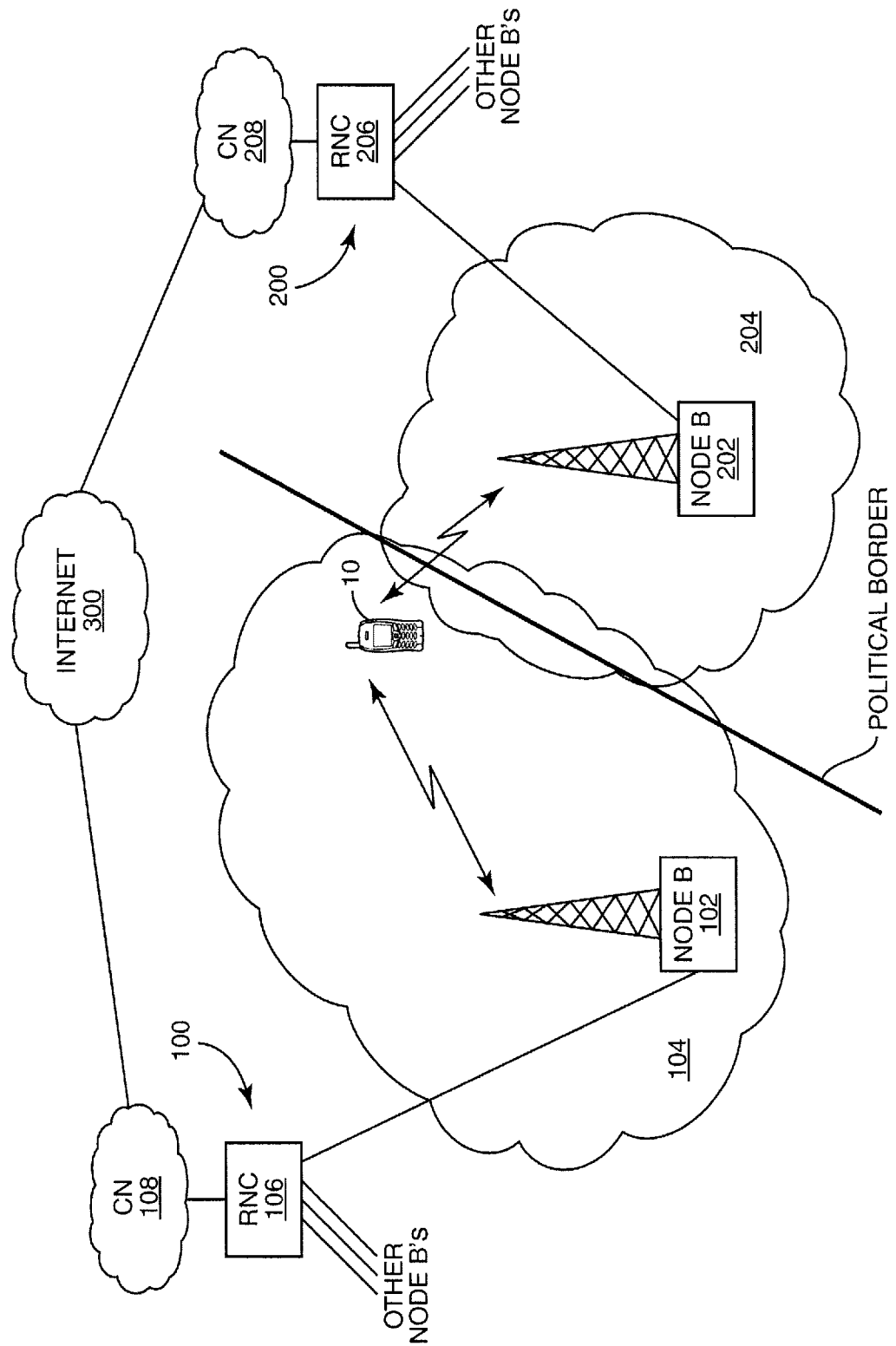
FIG. 1 is a diagram of two PLMNs operating across a political border.

FIG. 1 depicts a mobile User Equipment (UE) 10 in wireless communication with a PLMN 100 in a first country. The PLMN 100 includes a Node B 102 providing wireless communication services within a cell 104, under the control of a Radio Network Controller (RNC) 106. The RNC 106 is connected to a Core Network (CN) 108, which in turn communicates with various networks such as a Public Telephone Switching Network PTSN) the Internet 300, or the like. As the UE 10 moves through the cell 104, in the region of the border between the first country hosting the PLMN 100 and a second country, the UE may establish communications with a PLMN 200 in the second country. The PLMN 200 similarly includes a Node B 202 providing wireless communication services within a cell 204, under the control of a Radio Network Controller (RNC) 206. The RNC 206 is connected to a Core Network (CN) 208, which in turn communicates with various networks such as the Internet 300.

The PLMN 200 may offer wireless communication services over frequency bands different than those offered by the PLMN 100. Normally, the UE 10 will discover these services only upon performing a full search of all frequencies on which the UE 10 is capable of receiving wireless communication service. However, if the UE 10 recently concluded such a search, the next scheduled full frequency search—delayed to conserve battery power—may impose a suboptimal delay before the UE 10 discovers the full range of services offered by PLMN 200. Since one of these different-frequency services may be preferred, the mobile UE 10 would optimally conduct the search and discover the services sooner The UE 10 stores the Mobile Country Code (MCC) it receives from the PLMN 100, which corresponds to the first country. Upon nearing or crossing the border to the second country, the UE 10 will receive a different MCC from the PLMN 200. Upon detecting a change in the MCC, the UE 10 initiates a full frequency search, to determine the full range of wireless communication services provided by the PLMN 200. The cost in power consumption for performing the full frequency search, perhaps relatively soon following a previous full frequency search, is offset by the ability to exploit the full services provided by the PLMN 200. For example, a wireless communication service provided by the PLMN 200 in a frequency band different than that utilized by the PLMN 100 may incur a lower cost for use, such as due to a business arrangement between the provider or operator of the PLMN 200 and user's home wireless service provider. As another example, the PLMN 200 may provide High Speed Packet Access (HSPA) in one of the different frequency bands, allowing the UE 10 to access data services, such as web browsing, email, broadcast content, and the like.

If the UE 10 moves around in the area depicted in FIG. 1, it may cross the border several times, or receive MCCs from PLMN 100 and PLMN 200 several times. In this case, triggering a full frequency search upon every MCC change would entail excessive power consumption. To prevent this, upon a full frequency search in response to detecting an MCC change, the UE 10 waits a predetermined duration prior to performing another full search, even if the MCC changes in the meantime. The predetermined duration may be implemented in hardware as, e.g., a count-down timer, or may be implemented in software by storing a real-time clock value and monitoring when the real-time clock passes an offset. The predetermined duration may be hardwired, may be provisioned into the UE 10 at manufacture or during initialization, may be set during system configuration parameter negotiation upon registering with a PLMN 100, 200, or the like. In general, the predetermined duration may be fixed or programmable.

The UE 10 may discover a changed MCC in a variety of ways. In one embodiment, the UE 10 may be performing a limited search of frequencies known to be operated by PLMN 100, when it discovers PLMN 200 having a different MCC. In this case, the UE 10 would expand the search to all of its supported frequencies, to fully discover the services provided by PLMN 200 of which it may take advantage. In another embodiment, the UE 10 may exit service in PLMN 100 having a first MCC, and re-enter service in PLMN 200 having a second MCC different than the first MCC. In this case, having already searched part of its supported frequencies, the UE 10 would expand its search to cover all of its supported frequencies. In yet another embodiment, wherein the UE 10 is not camped on its home PLMN, it may periodically perform a limited search for a preferred or prioritized PLMN. If, during this limited search, a PLMN with a different MCC is discovered, the UE 10 would initiate a full search of all of its supported frequencies. In still another embodiment, the UE 10 may support multiple Radio Access Technologies (RAT). If a PLMN having a changed MCC is discovered, the UE 10 would notify all RATs of the changed MCC, and would initiate a full frequency search in each RAT, of all frequencies supported in that RAT.

Figure 2:
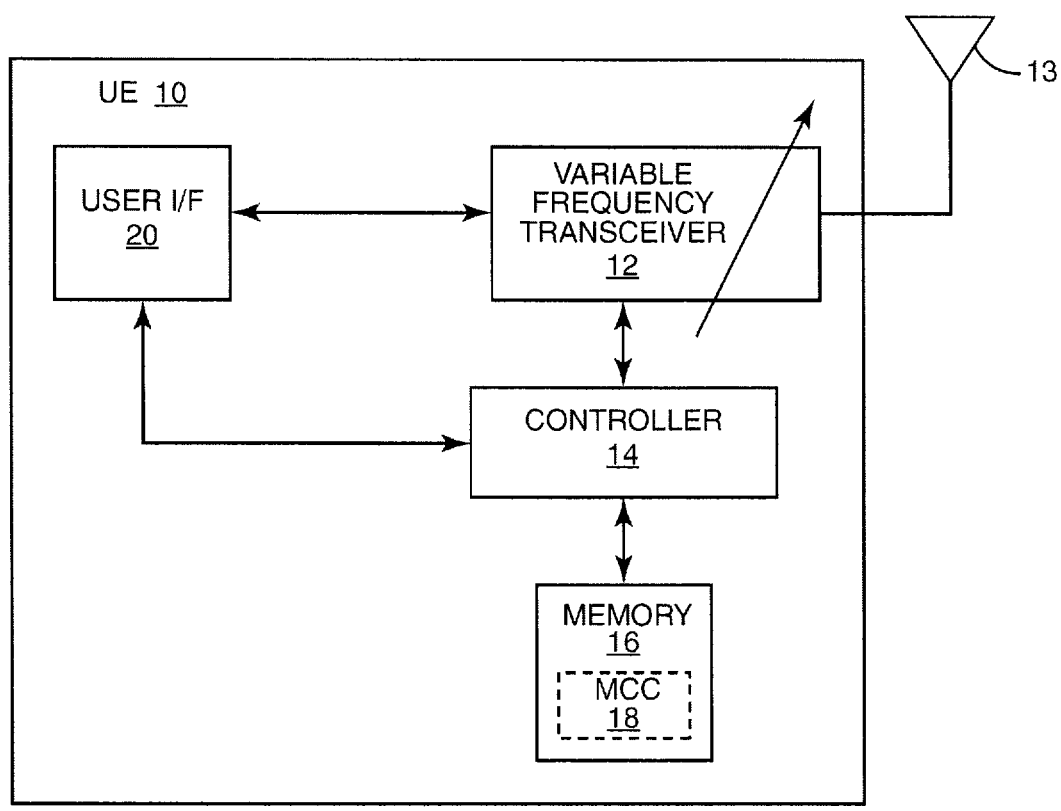
FIG. 2 is a functional block diagram of a UE.

A functional block diagram of a mobile UE 10 according to one embodiment of the present invention is depicted in FIG. 2. The UE 10 includes a variable frequency transceiver 12 connected to an antenna 13. The variable frequency transceiver 12 is operative to receive and transmit wireless communications signals in at least two frequency bands. The variable frequency transceiver 12, also known as a multimode transceiver, is controlled by a controller 14, which may comprise a stored-program microprocessor or Digital Signal Processor (DSP). The controller 14 is operatively connected to memory 16, which stores a current MCC value 18. The variable frequency transceiver 12 is also connected to a user interface module 20, which is also under the control of the controller 14. The user interface 20 includes a speaker, microphone, display, keypad, and the like to enable communication with the user. The UE 10 may include numerous functions not germane to the present invention, and omitted for clarity, such as dedicated graphics, audio, and/or video processing circuits, a cryptographic engine, a camera, and the like. Those of skill in the art will recognize that the functional modules 12, 14, 20 may be implemented as dedicated or programmable hardware, software modules executed on a microprocessor or DSP, or any combination of hardware, software, and firmware known in the art.

Figure 3:
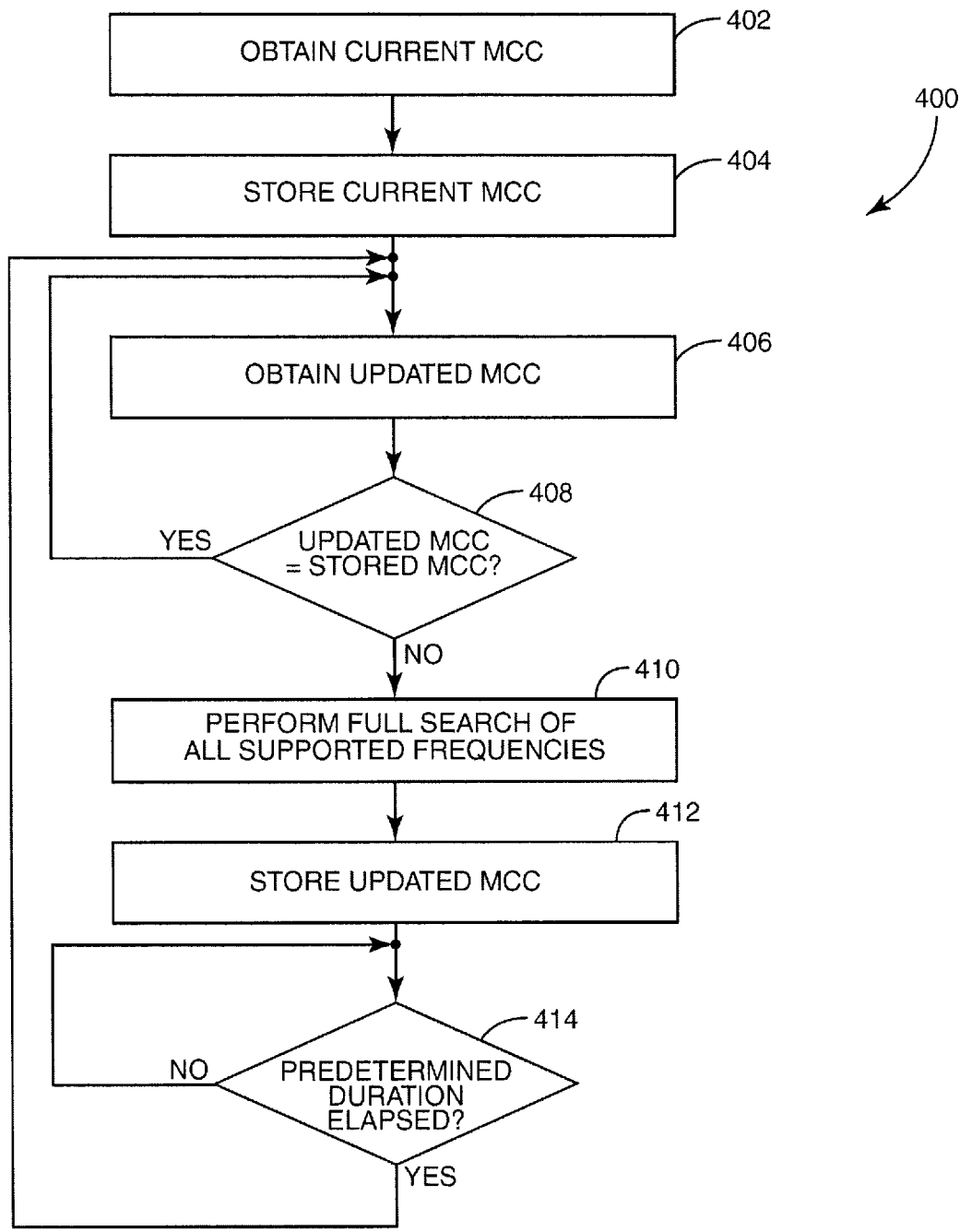
FIG. 3 is a flow diagram of a method of efficiently identifying a change in MCC when searching carrier frequencies.

FIG. 3 depicts a method 400 of efficiently identifying a change in MCC when searching carrier frequencies in a wireless communication system by a mobile UE 10. The UE 10 obtains a current MCC from a current PLMN (block 402), and stores the current MCC (block 404). The UE 10 later obtains an updated MCC (block 406) and compares it to the stored MCC. If the updated MCC is different than the stored MCC (block 408), then the UE 10 performs a full search of all supported frequencies (block 410), and stores the updated MCC (block 412) (replacing the previously stored MCC). The UE 10 then waits a predetermined duration (414) before again obtaining an updated MCC (block 406) to determine if a border has again been crossed. In another embodiment, only the frequency search may be delayed by the predetermined duration, and the UE 10 may continue to receive an updated MCC during this duration.

Embodiments of the present invention decrease the time required to find service when moving between geographical areas with wireless communication services provided in different frequency bands. The UE minimizes the time it is not registered to its home PLMN. The reduced time to find new services and lowered power consumption due to restrictions on MCC-triggered full frequency searches enhance the user's experience.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of efficiently identifying carrier frequencies in a wireless communication system by a mobile User Equipment (UE) upon crossing a country border, comprising:
   storing a Mobile Country Code (MCC) received over the air interface of a Public Land Mobile Network (PLMN) of a wireless communication service provider currently being accessed by the UE in a first country;
   obtaining an updated MCC;
   comparing the updated MCC to the stored MCC; and
   in response to the updated MCC being different than the stored MCC,
      determining that the UE has crossed a political border into a second country,
      initiating a timing function operative to indicate the elapse of a predetermined duration,
      if the UE supports more than one Radio Access Technology (RAT), sending a notification of the changed MCC to each supported RAT,
      performing a search, in each supported RAT, of all frequencies on which the UE can obtain wireless communication services,
      discovering wireless communication services available to the UE in the second country as a result of the frequency search, and
      repeating the method steps only after expiration of the predetermined duration.

2. The method of claim 1 wherein obtaining an updated MCC comprises obtaining the updated MCC upon a return to service from an out-of-service condition.

3. The method of claim 1 wherein obtaining an updated MCC comprises obtaining the updated MCC during a partial frequency search.

4. The method of claim 3 wherein the UE is receiving limited service, and the partial frequency search is a search for a wireless communication service provider providing full service.

5. The method of claim 3 wherein the UE is not camped on a home wireless communication service provider, and the partial frequency search is a search for a higher prioritized wireless communication service provider.

6. A mobile wireless communication system User Equipment (UE) operative to search for services upon crossing country borders, comprising:
   a transceiver operative to receive a Mobile Country Code (MCC) over the air interface of a Public Land Mobile Network (PLMN) of a wireless communication service provider currently being accessed by the UE in a first country;
   memory operative to store the MCC; and
   a controller operative to
      direct the transceiver to obtain an updated MCC,
      compare the updated MCC to the stored MCC, and
      in response to a change in the MCC,
         determine that the UE has crossed a political border into a second country,
         initiate a timing function operative to indicate the elapse of a predetermined duration,
         if the UE supports more than one Radio Access Technology (RAT), direct the transceiver to send a notification of the changed MCC to each supported RAT,
         direct the transceiver to search, in each supported RAT, all frequencies on which the UE can obtain wireless communication services,
         discover wireless communication services available to the UE in the second country as a result of the frequency search, and
         repeat the method steps only after expiration of the predetermined duration.

7. The UE of claim 6 wherein the controller is operative to obtain an updated MCC by obtaining the updated MCC upon a return to service from an out-of-service condition.

8. The UE of claim 6 wherein the controller is operative to obtain an updated MCC by obtaining the updated MCC during a partial frequency search.

9. The UE of claim 8 wherein the UE is receiving limited service, and the partial frequency search is a search for a wireless communication service provider providing full service.

10. The UE of claim 8 wherein the UE is not camped on a home wireless communication service provider, and the partial frequency search is a search for a higher prioritized wireless communication service provider.

* * * * *